(12) United States Patent
Halling

(10) Patent No.: US 8,899,592 B2
(45) Date of Patent: Dec. 2, 2014

(54) SEAL

(71) Applicant: Seal Science and Technology, LLC, Durham, CT (US)

(72) Inventor: Horace P. Halling, Durham, CT (US)

(*) Notice: Subject to any disclaimer, the term of this patent is extended or adjusted under 35 U.S.C. 154(b) by 0 days.

(21) Appl. No.: 13/970,664

(22) Filed: Aug. 20, 2013

(65) Prior Publication Data

US 2013/0334772 A1    Dec. 19, 2013

Related U.S. Application Data

(60) Continuation of application No. 12/877,513, filed on Sep. 8, 2010, now abandoned, and a division of application No. 11/610,220, filed on Dec. 13, 2006, now Pat. No. 7,810,816.

(60) Provisional application No. 60/749,908, filed on Dec. 13, 2005.

(51) Int. Cl.
| | |
|---|---|
| *F16J 15/02* | (2006.01) |
| *F16J 15/06* | (2006.01) |
| *F16J 15/08* | (2006.01) |
| *F16L 23/20* | (2006.01) |
| *F01D 11/00* | (2006.01) |
| *F01D 9/02* | (2006.01) |

(52) U.S. Cl.
CPC ........... *F16J 15/06* (2013.01); *Y02T 50/672* (2013.01); *F16J 15/0887* (2013.01); *F05D 2240/55* (2013.01); *F16L 23/20* (2013.01); *F01D 11/005* (2013.01); *F01D 9/023* (2013.01)
USPC .......................................... 277/312; 277/316

(58) Field of Classification Search
USPC ........................................ 277/312, 314, 316
See application file for complete search history.

(56) References Cited

U.S. PATENT DOCUMENTS

| 1,825,962 | A | * | 10/1931 | Laird ............................. 277/614 |
|---|---|---|---|---|
| 2,647,810 | A | * | 8/1953 | McCuistion ................... 277/466 |
| 4,674,756 | A | * | 6/1987 | Fallon et al. .................. 277/624 |
| 6,481,762 | B1 | * | 11/2002 | Rex et al. ...................... 285/337 |
| 7,083,171 | B2 | * | 8/2006 | Oida et al. ..................... 277/644 |

* cited by examiner

*Primary Examiner* — Vishal Patel
(74) *Attorney, Agent, or Firm* — Robert Curcio; DeLio, Peterson & Curcio, LLC

(57) ABSTRACT

A seal is inserted into a space to be sealed. First and second end portions of the seal are engaged with first and second end surfaces of the space. The seal is compressed between the first and second end surfaces. The compression strains the seal. The strain includes the rotation of a cross-section of the seal so as to bias the seal into engagement with a surface forming one of an inboard surface and an outboard surface of the space.

8 Claims, 16 Drawing Sheets

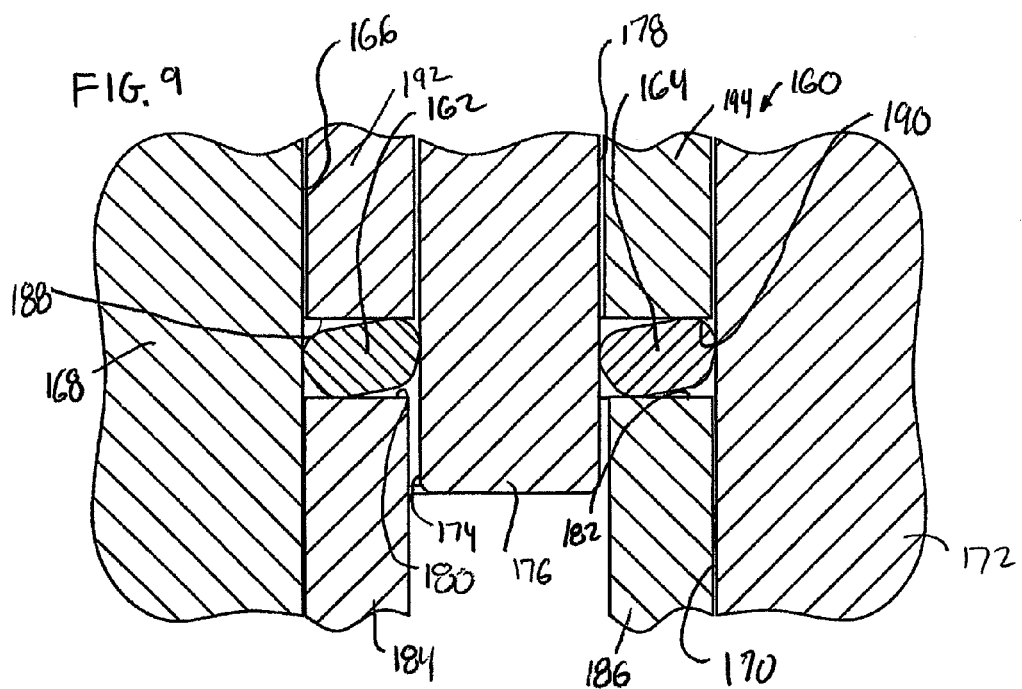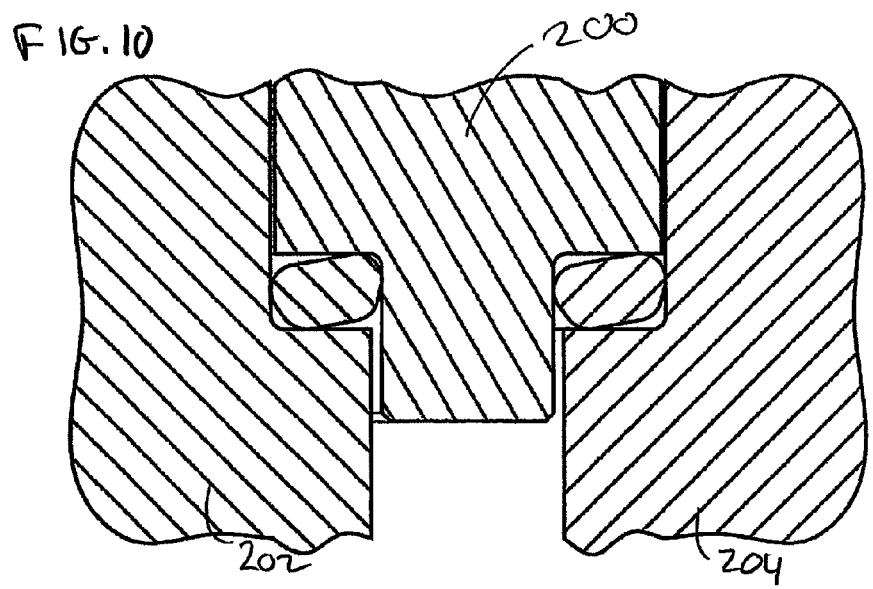

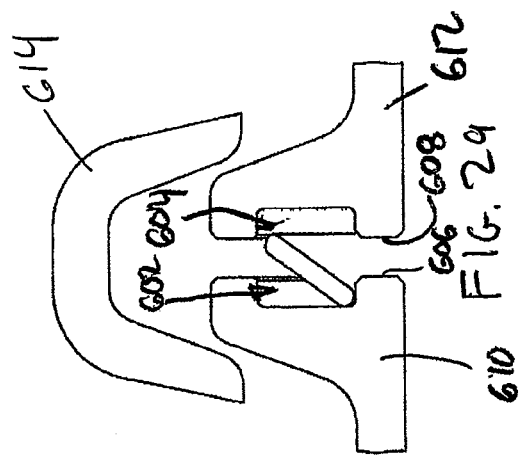
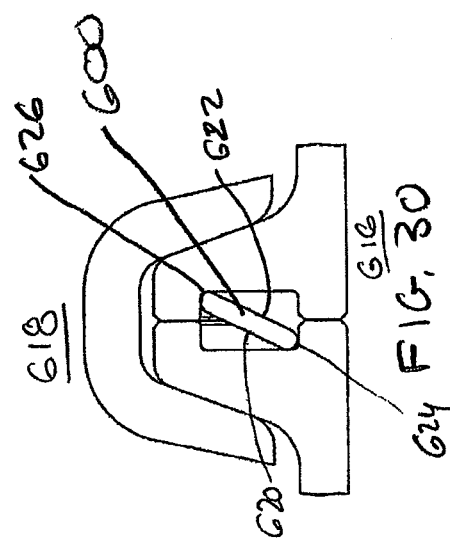
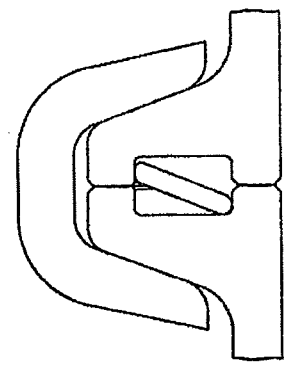

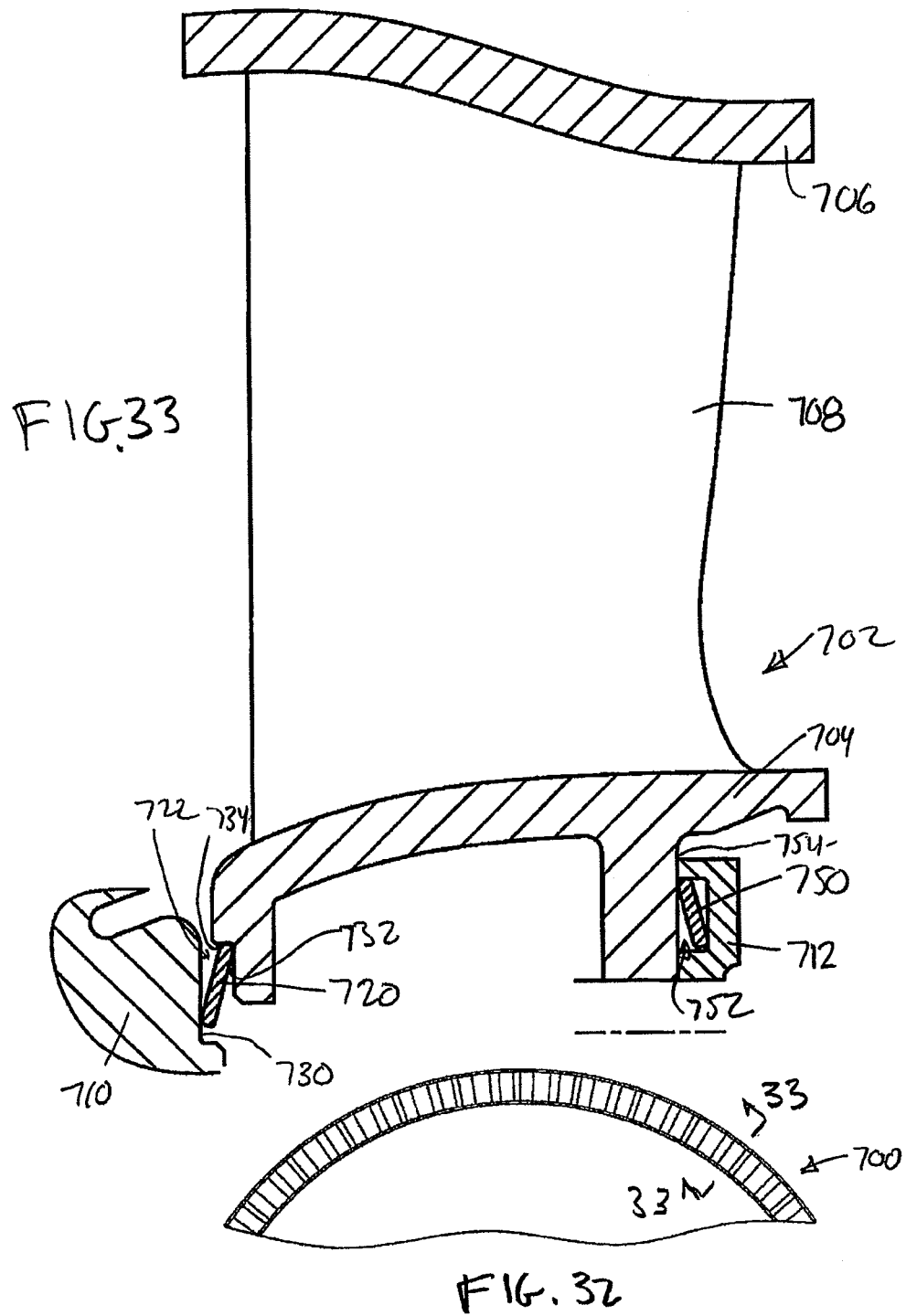

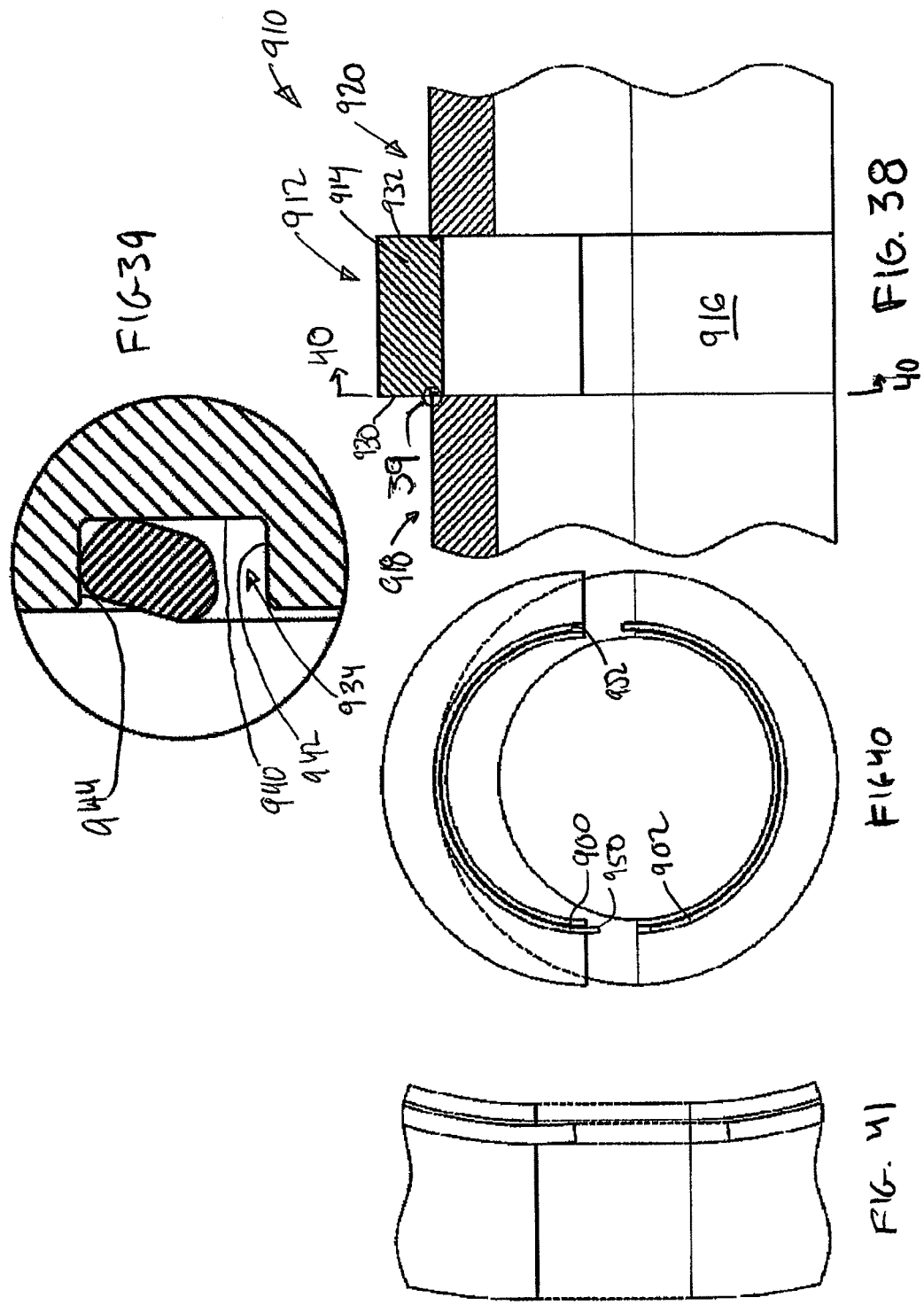

SEAL

BACKGROUND OF THE INVENTION

The invention relates to seals. More particularly, the invention relates to compression seals.

A variety of metallic seal configurations exist. Many metallic seals are commonly held under compression between two opposed flanges of the elements being sealed to each other. Such metallic seals may be used in a variety of industrial applications.

Many examples of such metallic seals are of an annular configuration, having a convoluted radial section which permits the seal to act as a spring and maintain engagement with the flanges despite changes or variations in the flange separation. Certain such seals have an S-like section while others have a section similar to the Greek capital letter sigma (Σ) with diverging base and top portions. Other similar seals are formed with additional convolutions.

SUMMARY OF THE INVENTION

One aspect of the invention involves a method for sealing a space. A seal is inserted into the space. First and second end portions of the seal are engaged with first and second end surfaces of the space. The seal is compressed between the first and second end surfaces. The compression strains the seal. The strain includes the rotation of a cross-section of the seal so as to bias the seal into engagement with a surface forming one of an inboard surface and an outboard surface of the space.

In various implementations, the space may have both said inboard surface and said outboard surface and the sealing may be between said inboard and outboard surfaces. The seal may be inserted into the space in a non-interference relation. The seal may be exposed to an operational fluid pressure difference across the seal in the space (e.g., resulting from normal or abnormal operation of the members being sealed). The pressure difference acts to increase an engagement bias of the seal against at least one of the inboard and outboard surfaces. The cross-section may have an exterior perimeter formed as a rounded-corner trapezoid. In a relaxed condition, the base and top of the trapezoid may have off-longitudinal normals. The engaging may be along first and second diagonally opposite ones of the rounded corners. The compressing may bring the third and fourth rounded corners into respective engagement with the inboard and outboard surfaces. The seal may be engineered so that the actual or abnormal fluid pressure difference provides a desired increase in the engagement bias of the seal against at least one of the inboard and outboard surfaces. The engaged first and second end portions may be offset normal to a direction of the compressing so as to cause the rotation (e.g., at different radii for an annular seal of circular planform).

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 9 is a partial central longitudinal sectional view of a pair of seals in a first wellhead.
FIG. 10 is a partial central longitudinal sectional view of a pair of seals in a second wellhead.
FIG. 29 is a view of a seal in an initial stage of installation.
FIG. 30 is a view of the seal of FIG. 29 in a compressed condition.
FIG. 31 is a view of the seal of FIG. 29 exposed to a pressure difference.
FIG. 32 is a view of a vane ring assembly.
FIG. 33 is a sectional view of the assembly of FIG. 32 showing fore and aft seals.

FIG. 38 is a partial, partially longitudinally cutaway view of a turbine case in an intermediate stage of assembly.

FIG. 39 is an enlarged view of a seal of the case of FIG. 38.

FIG. 40 is a transverse cutaway view of the case of FIG. 38.

FIG. 41 is an enlarged view of the case of FIG. 40.

Like reference numbers and designations in the various drawings indicate like elements.

DETAILED DESCRIPTION

Figure 2:
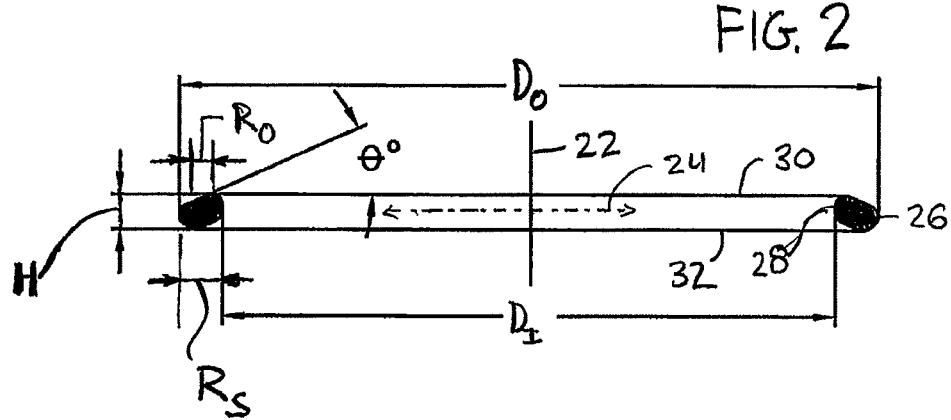
FIG. 2 is a central longitudinal sectional view of the seal of FIG. 1.
Figure 1:
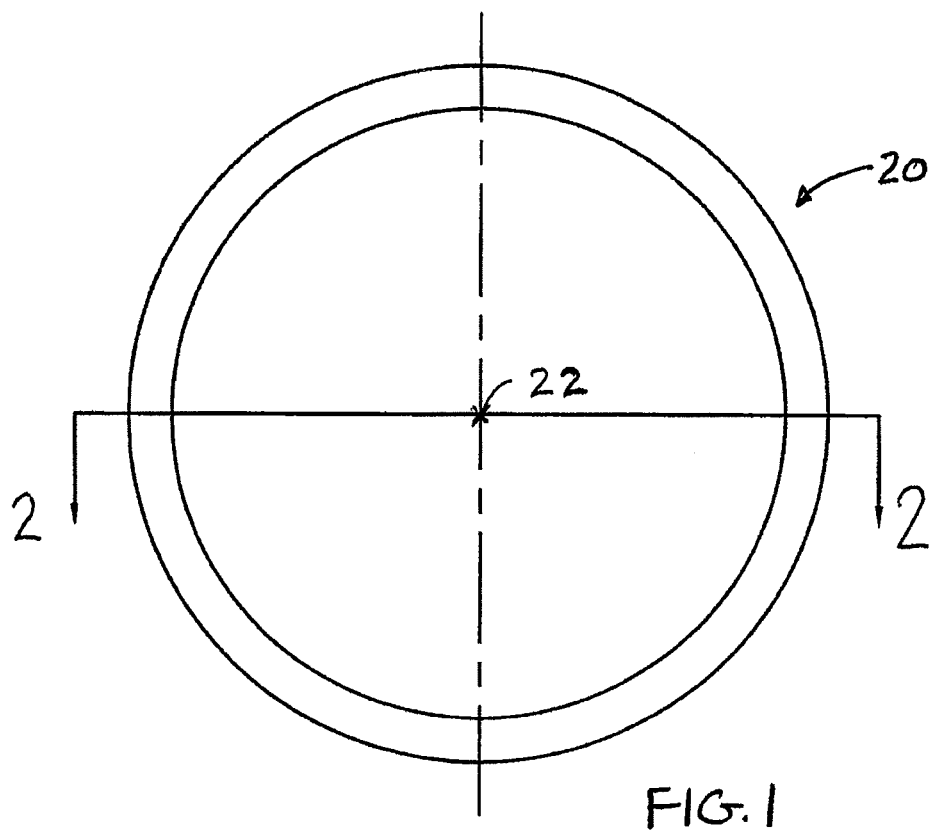
FIG. 1 is a plan view of a first seal.

FIGS. 1 and 2 show a seal 20 having a central longitudinal axis 22. The exemplary seal 20 is of closed circular annular planform. Other configurations are, however, possible (e.g., obround, rounded-corner rectangular, or yet more complex planforms). The seal also is shown having a transverse centerplane 24. The exemplary seal has a relaxed outer diameter $D_O$ at a radial outboard extreme 26 and a relaxed inner diameter $D_I$ at a radial inboard extreme 28. A relaxed seal radial span $R_S$ is half the difference between $D_O$ and $D_I$. The seal has a relaxed height H between first and second longitudinal extremes or rims 30 and 32. Exemplary $R_S$ is small relative to the diameters. For example, the exemplary $R_S$ is less than 10% of $D_O$. Exemplary $R_S$ and H are of similar orders of magnitude (e.g., $R_S$ being 50-500% of H). The exemplary rims are radially offset from each other by a radial offset $R_O$.

Figure 3:
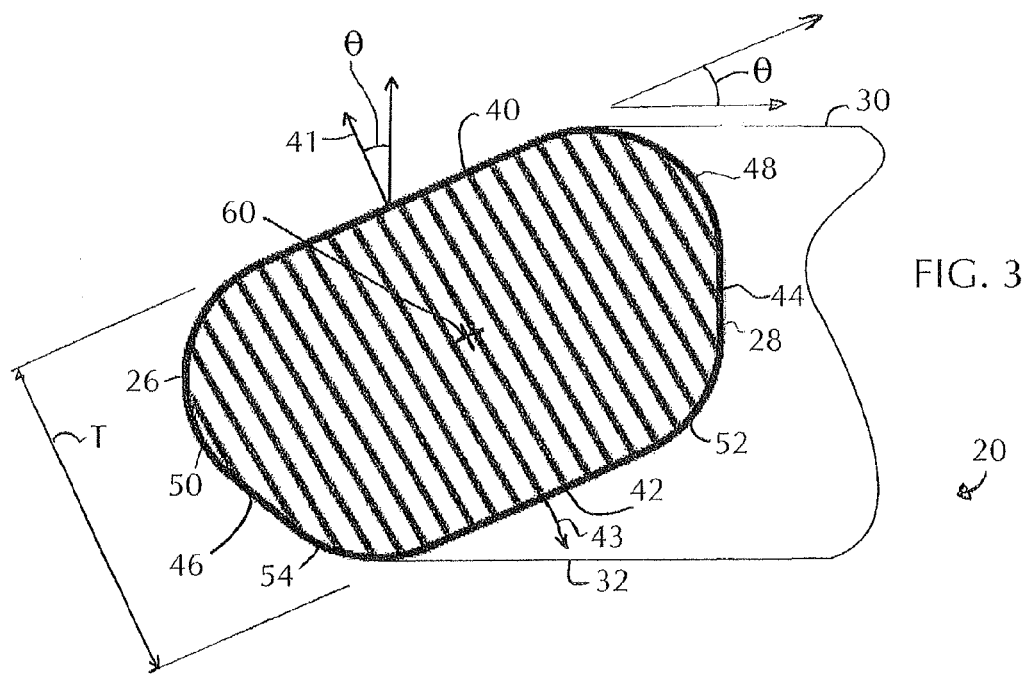
FIG. 3 is a partial view of the seal of FIG. 2.

FIG. 3 shows the seal cross-section as a rounded-corner trapezoid. The exemplary trapezoid is a regular trapezoid having lateral symmetry. The trapezoid includes a base 40 (i.e., the longer of the two parallel sides). The base 40 is at an angle θ off-radial (the half angle of the frustoconical surface being 90° minus θ). The cross-section has a top 42 parallel to the base 40 and spaced-apart by a thickness T. Thus, surface normals 41 and 43 of the base 40 and top 42 are off-longitudinal by the same angle θ. In the exemplary configuration, the base 40 forms a convergent/external frustoconical surface having a half angle of 90° minus θ and the top 42 forms a divergent/internal conical surface of similar half angle.

The seal cross-section includes first and second sides 44 and 46. A rounded corner 48 transitions between the base 40 and first side 44; a rounded corner 50 transitions between the base 40 and second side 46; a rounded corner 52 transitions between the first side 44 and top 42; and a rounded corner 54 transitions between the second side 46 and the top 42. In the exemplary relaxed condition, the rim 30 falls along the corner 48 relatively near the base 40; the second rim 32 falls along the corner 54 relatively near the top 42; the outboard extreme 26 falls along the corner 50; and the inboard extreme 28 may be represented by the first side 44 or may be along the corners 48 or 52 near the first side 44. A center 60 of the seal cross-section may be represented by the centroid or, for the exemplary regular trapezoid, the central midpoint between the base 40 and top 42. In the exemplary circular planform seal 20, the center 60 forms a circle along which the seal cross-section is swept 360° about the axis 22.

Figure 4:
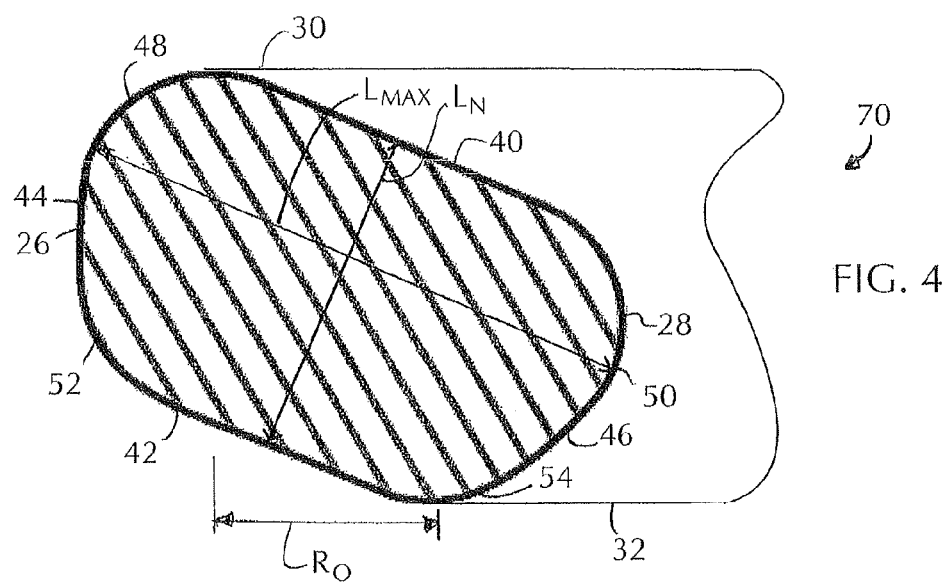
FIG. 4 is a partial central longitudinal sectional view of a second seal.

FIG. 4 shows an alternate seal 70 otherwise similar to the seal 20 but wherein the cross-section is inverted left-to-right about the center 60 so that the outboard extreme falls along or near the side 44; the inboard extremity falls centrally along the corner 50; the base 40 forms an internal surface; the top 42 forms an external surface; and the first longitudinal extreme 30 (upper as viewed in FIG. 4) is at a greater radius than the second longitudinal extreme 32 by the offset $R_O$.

Figure 5:
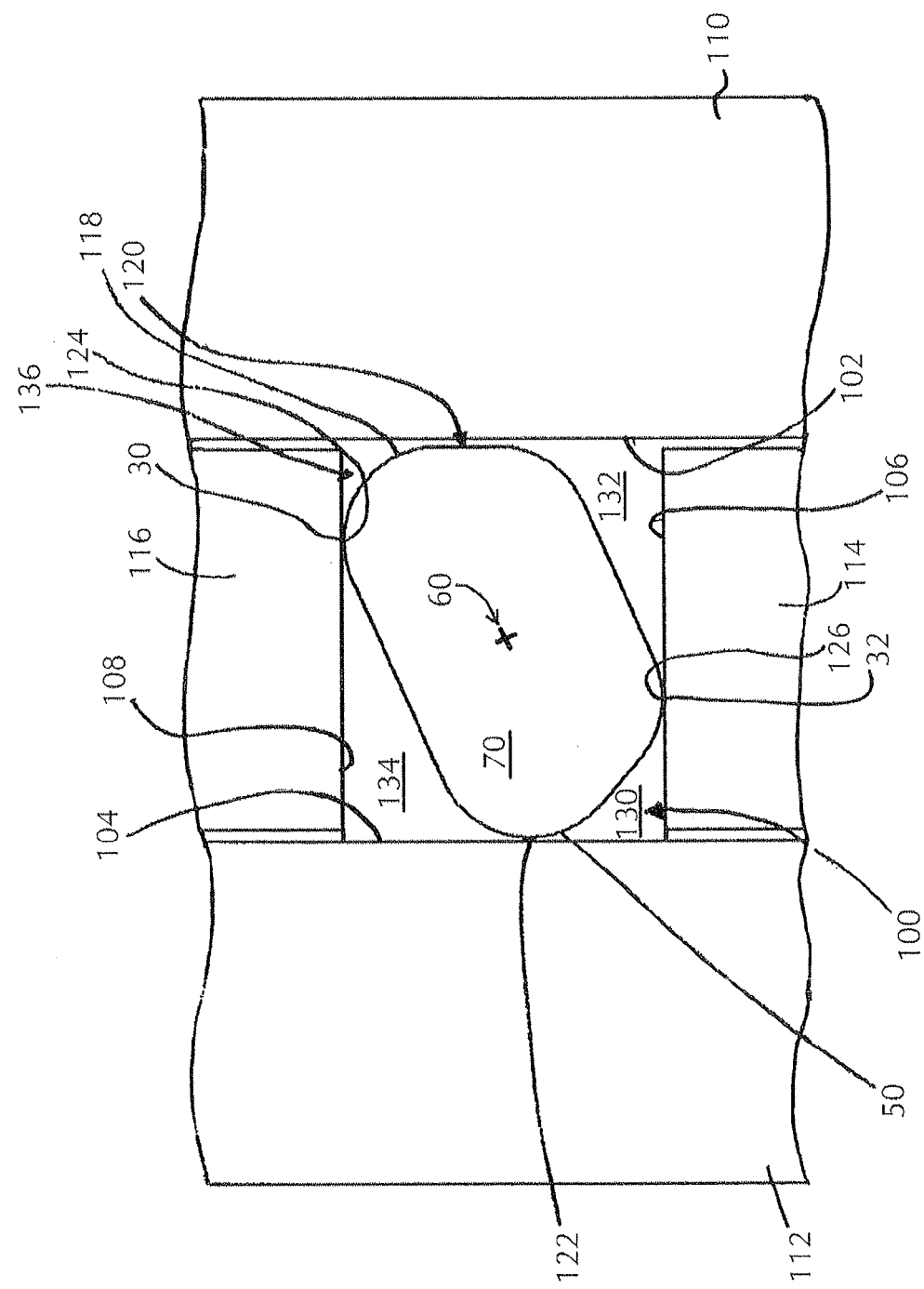
FIG. 5 is a partial central longitudinal sectional view of the seal of FIG. 1 in an initial condition of installation.

FIG. 5 shows the seal 70 installed in an annular space or compartment 100 defined between longitudinal surface 102, longitudinal surface 104, and first and second radially-extending longitudinal end surfaces 106 and 108. The exemplary surface 102 may be along an outboard member 110 and the exemplary surface 104 may be along an inboard member 112 separate from the outboard member 110 and to be sealed relative thereto. The surfaces 106 and 108 may respectively be along members 114 and 116. The members 114 and 116 may be separate from or integrated with one of the members 110 and 112. For example, the member 114 may be integral with the outboard member 110 and the member 116 may be integral with the inboard member 112.

The seal may initially be longitudinally installed in a relaxed condition freely without radial interference inboard and/or outboard (or with very light interference). For example, with the members 110, 112, and 114 in position and the member 116 remote, the seal may be longitudinally inserted through the associated open annular channel end. The member 116 may then be inserted to close the channel to form the space 100. Among other alternatives where the members 110 and 112 are not pre-positioned, the seal may be pre-placed around the member 110 or within the member 112. In this relaxed installation state, there may be gaps 120 and 122 between the seal outboard and inboard extremes and the adjacent surfaces 102 and 104. To provide sealing, the members 114 and 116 and their associated surfaces 106 and 108 are drawn toward each other. The surfaces 106 and 108 may initially engage the rims 30 and 32. Because the contact locations 124 and 126 are at different radii (initially offset by $R_O$ (FIG. 4)), the radial difference allows the compression by the members 114 and 116 to form a couple. The couple rotates the seal cross-section (e.g., clockwise about the center 60 in the view of FIG. 5). The rotation may shift the contact locations along the seal and the members being sealed. The shift may alter the radial offset of the contact locations. Under compression, the contact locations will cease to be single-point (in section) and will be distributed. Nevertheless, the contact locations may be represented as medians, averages, peak pressure locations, and the like. This rotation brings the corner 48 into compressive engagement with the surface 102 and the corner 50 into compressive engagement with the surface 104. With this engagement, the seal may sealingly separate four separate regions 130, 132, 134, and 136 of the space 100. With the exemplary seal, the seal corners are sufficiently smooth and blunt as are the associated mating surfaces so that neither the seal nor the mating surfaces are permanently engraved or similarly deformed by the other (e.g., so that the seal and mating surfaces may be reusable).

Figure 6:
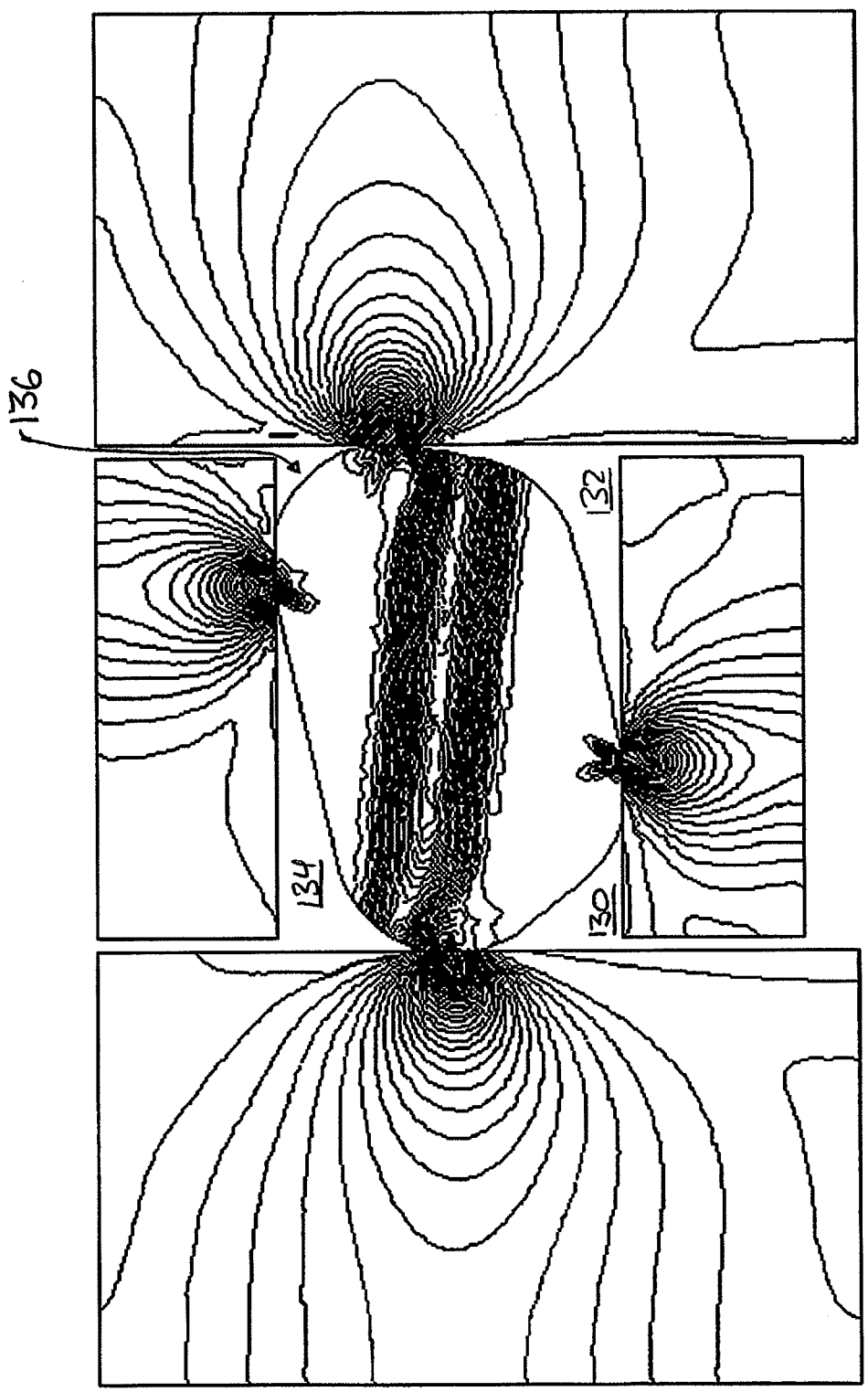
FIG. 6 is a stress plot of the seal of FIG. 5 under compression.
Figure 7:
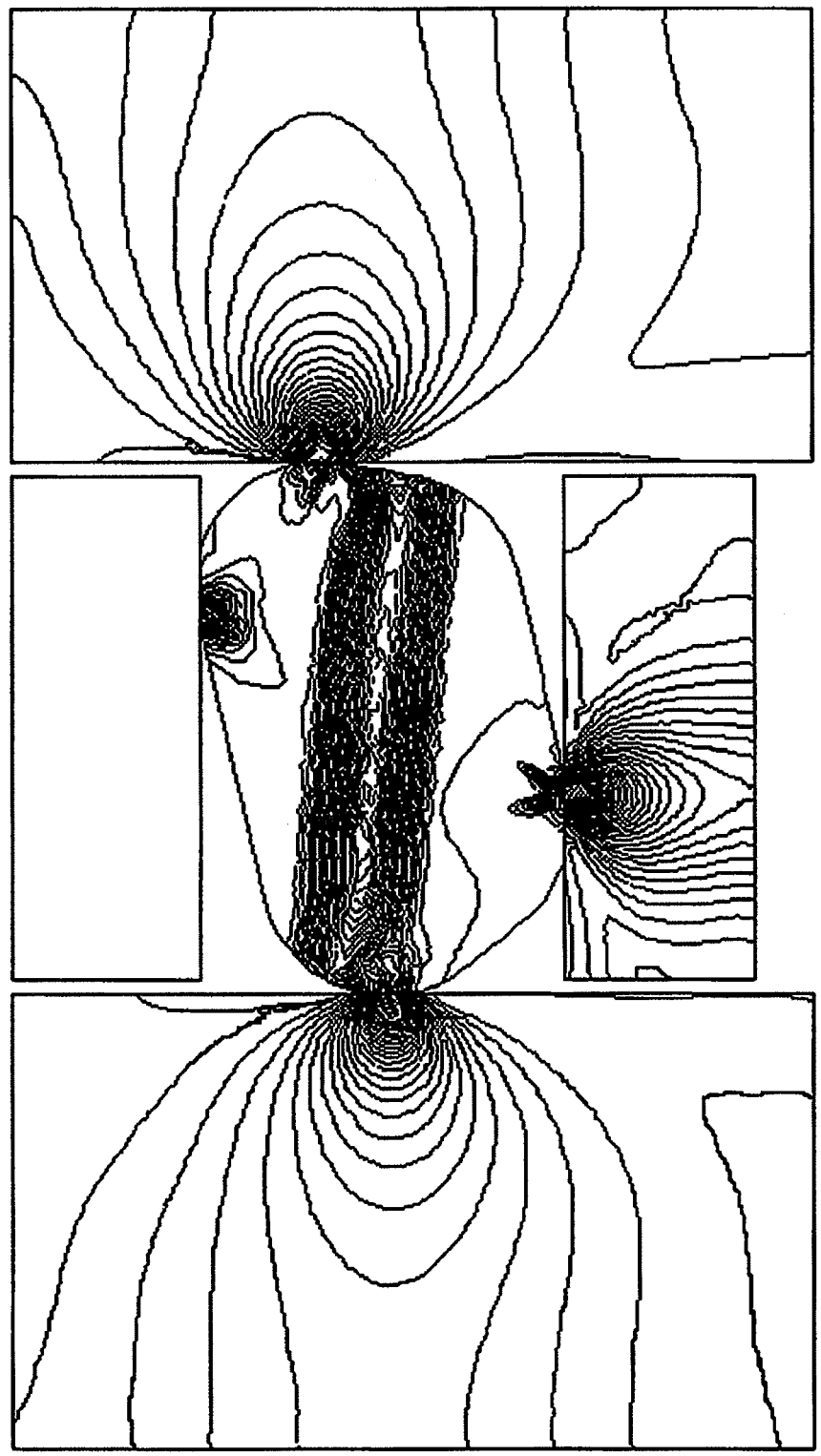
FIG. 7 is a stress plot of the seal of FIG. 5 under compression and a first pressure difference.
Figure 8:
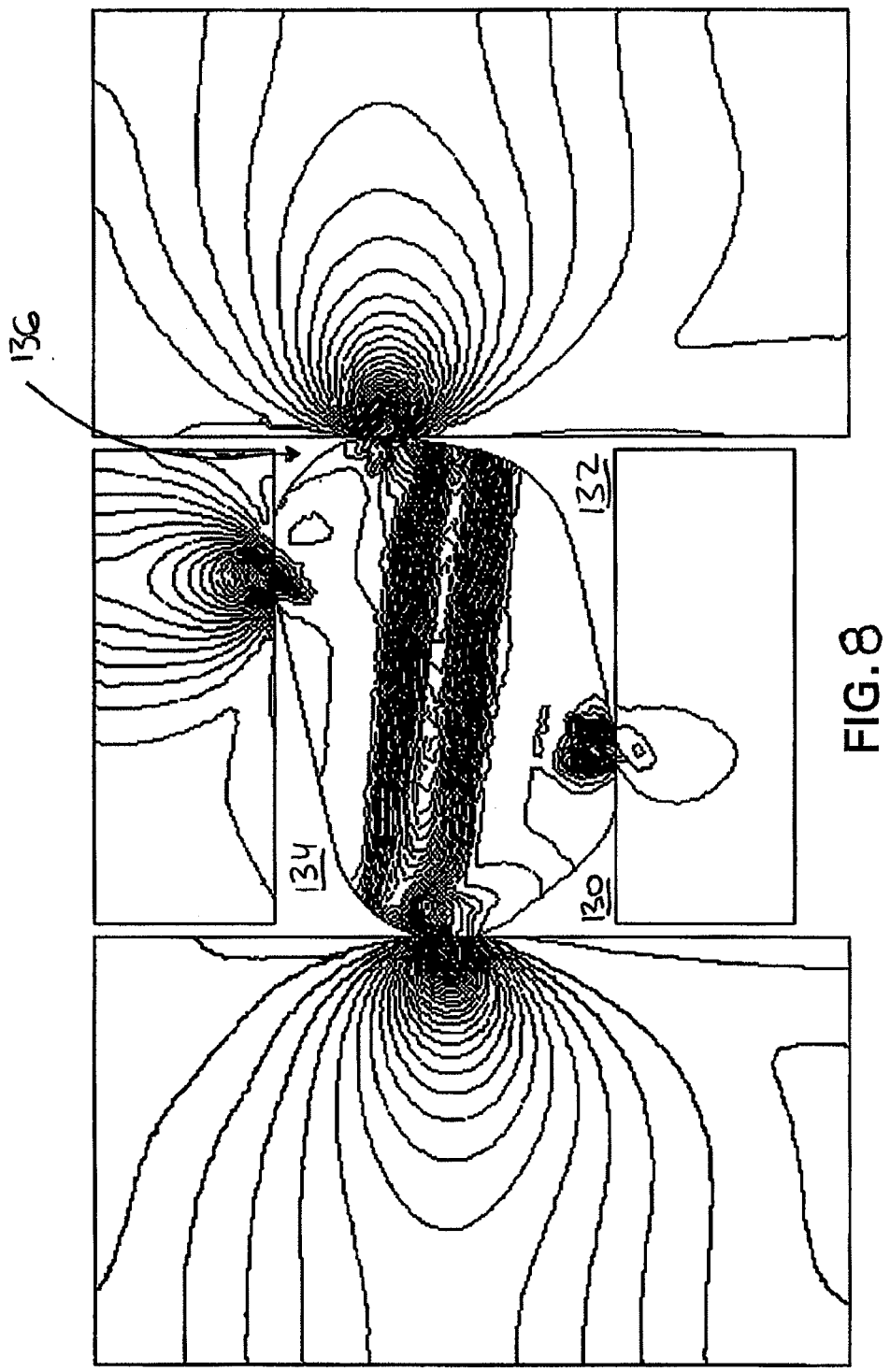
FIG. 8 is a stress plot of the seal of FIG. 5 under compression and a second pressure difference.

FIG. 6 shows stress distribution in the seal and the mating members in the compressed condition without differential pressurization of the regions 130, 132, 134, and 136. Depending upon operational parameters, differences among pressure in the regions 130, 132, 134, and 136 may augment the sealing and the particular cross-sectional shape and orientation of the seal may be configured to take advantage of this. For example, with the exemplary seal, a pressure in the region 134 above that in the region 132 may tend to further rotate the seal section clockwise as-viewed and increase the engagement forces between the seal and the surfaces 102 and 104. FIG. 7 shows the stress distribution for such a situation. Sealing engagement between the members 110 and 112 is supplemented by the pressure. Additionally, the contact location 126 serves as a fulcrum. Accordingly, local compressive stress in the member 114 is increased thereby increasing sealing at the contact location 126. Compressive stress at the contact location 124 is reduced thereby greatly reducing stress in the member 116. Although local sealing at the contact location 124 may be reduced, the maintenance of sealing at the radial contact locations maintains seal integrity. FIG. 8 shows an opposite pressurization wherein the pressure in the region 132 exceeds that of the region 134.

Accordingly, the exemplary seal in the exemplary space can function effectively as a bidirectional seal. Also, the exemplary seal could be installed upside-down and still provide bidirectional sealing, thereby avoiding problems of installer error. Nevertheless, the seals may be applied to environments (i.e., configurations of the space being sealed) where only unidirectional sealing is necessary or where the seal must be installed in a particular one of the two orientations.

The longitudinal resilience of the exemplary seal is associated more with changes in its cross-sectional orientation than with changes to its cross-section. This may be distinguished from certain annular springs and spring seals. To achieve this, the exemplary seal cross-section is of relatively low aspect or slenderness ratio. The aspect ratio may be measured in several ways. One way is to determine the largest linear dimension of the cross-section (approximately shown by $L_{MAX}$ in FIG. 4). This is compared with the largest dimension normal thereto (e.g., approximately shown as $L_N$). Exemplary ratios of $L_{MAX}$ to $L_N$ are broadly less than 10:1 and less than 3:1 in the FIG. 4 example. Alternative measurements may be used, especially for highly regular seals (e.g., length to width ratios of a rectangular section seal). Another characterization of slenderness may involve the direct distance between the seal longitudinal extremes (not the longitudinal distance or height) relative to the maximum dimension normal thereto. It can further be seen that the exemplary seals of FIGS. 1-4 are relatively non-convoluted. For example, the length $L_{MAX}$ and the line between longitudinal extremes both fall entirely within the seal rather than passing outside the seal as would be the case with a C-seal or other such spring seal.

Exemplary seal materials are metals (e.g., alloys), optionally coated (e.g., electroplated). Exemplary alloys are nickel aluminum bronze, stainless steel or other iron-based alloys, copper, beryllium copper, nickel- or cobalt-based superalloys, and the like. For example, for the wellhead seal discussed below, an uncoated nickel aluminum bronze may be used. Alternatively, a plated superalloy may be used (e.g., silver-plated Alloy 718). In a turbine nozzle application discussed below, an exemplary material is a nickel- or cobalt-based superalloy (e.g., Alloy 718 or Waspaloy (UNS: N07001) coated with an intermetallic, cermet coating). Alternative materials include metal matrix composites (e.g., metal matrices including ceramic fibers such as silicon carbide or alumina). Exemplary matrices may be formed by spray deposition (e.g., of a titanium-aluminum-vanadium alloy such as Ti6Al4V), powder metallurgy, mechanical alloying, liquid metal pressure forming, stir casting, squeeze casting, and reactive processing. Non-metallic seal materials may nevertheless be used.

Exemplary seal manufacturing techniques may involve one or more rough stages including rough forming and rough machining and one or more finish stages including finish machining and polishing. For small diameter seals, initial machining may be from bar, ring, or tube stock. For intermediate diameter seals, forging or casting may be followed by machining Alternatively, butt-welded rings may be formed and spin profiled. Large rings may be formed by close-to-form extruded wire rolling followed by butt welding, dressing, and critical surface machining/polishing. Nevertheless, other manufacturing techniques may be used.

In various examples, the seals may be used in the oil industry (e.g., wellheads, Christmas trees, and the like). FIG. 9 shows a wellhead assembly 160 similar to that shown in U.S. Pat. No. 6,164,663 of Turner. The exemplary wellhead assembly 160 includes an aligned pair 162 and 164 of concentric annular seals to seal between an outer diameter (OD) surface 166 of a tubing hanger 168 and an interior/inner diameter (ID) bore surface 170 of a wellhead 172. In the example, the inboard seal 162 seals between the surface 166 and an interior (ID) surface 174 of a spacer ring 176. The outer seal 164 seals between the (OD) surface 178 of the spacer ring and the wellhead bore surface 170. To provide the longitudinal compression that in turn causes radial engagement and sealing, lower longitudinal extremities of the seals 162 and 164 engage respective rim surfaces 180 and 182 of inboard and outboard support rings 184 and 186, respectively secured/attached to the tubing hanger and wellhead. Similarly, the upper longitudinal extremities of the seals 162 and 164 respectively engage lower rim surfaces 188 and 190 of inboard and outboard legs 192 and 194 of a U-ring loader. Whereas the '663 patent maintains sealing engagement by downward biasing of a wedge ring (in the physical place of the spacer ring 176 and having a wedge surface partially in place of the illustrated cylindrical surface), sealing may be maintained by downward bias of the U-ring loader without necessarily having any bias of the spacer ring or any wedge effect.

FIG. 10 shows an alternative arrangement which effectively unifies the FIG. 9 spacer ring 176 and U-ring loader into a single T-ring loader 200. The support rings are integrated with their associated tubing hanger and wellhead as a tubing hanger 202 and wellhead 204.

Yet other seal sections are possible.

Figure 11:
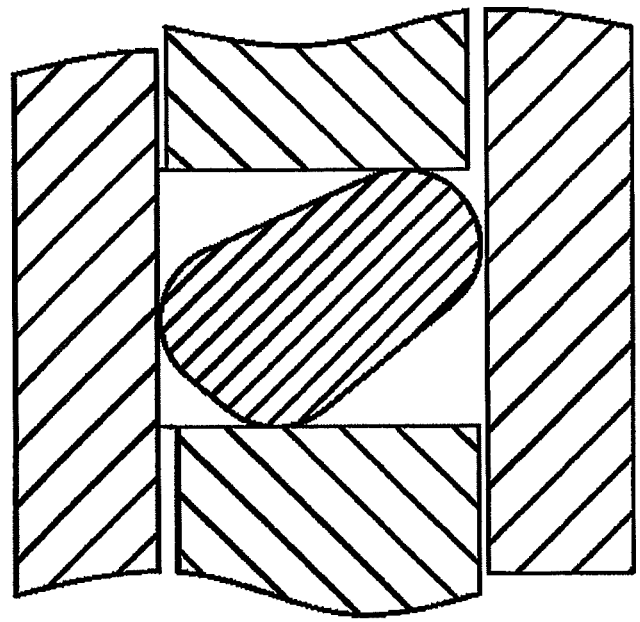
FIG. 11 is a partial central longitudinal sectional view of a seal having a rounded-corner triangular section.

FIG. 11 shows a seal having a rounded-corner triangular exterior cross-section.

Figure 12:
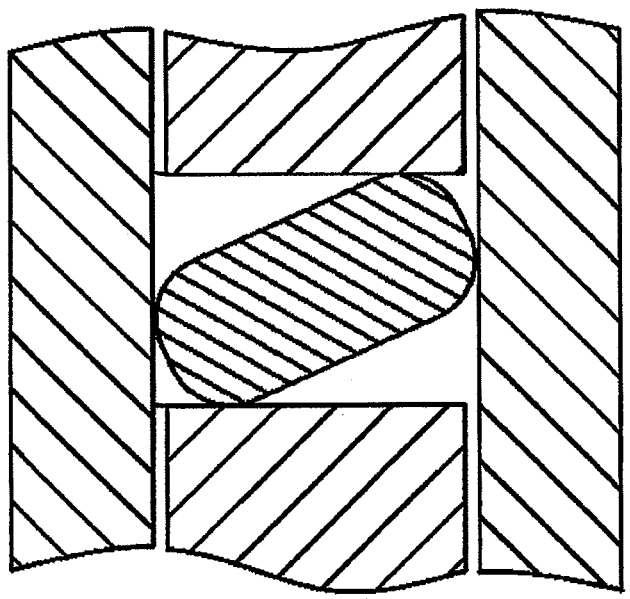
FIG. 12 is a partial central longitudinal sectional view of a seal having a rounded-corner rectangular section.

FIG. 12 shows a seal having a rounded-corner rectangular exterior cross-section.

Figure 13:
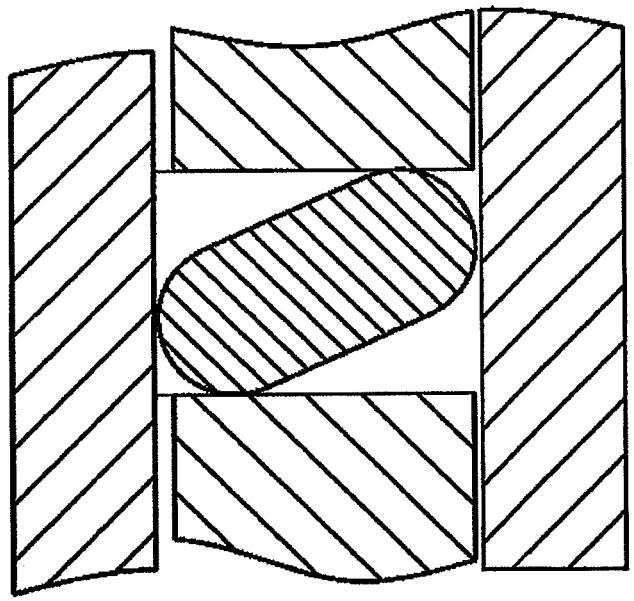
FIG. 13 is a partial central longitudinal sectional view of a seal having an obround cross-section.

FIG. 13 shows a seal having an obround exterior cross-section.

Figure 14:
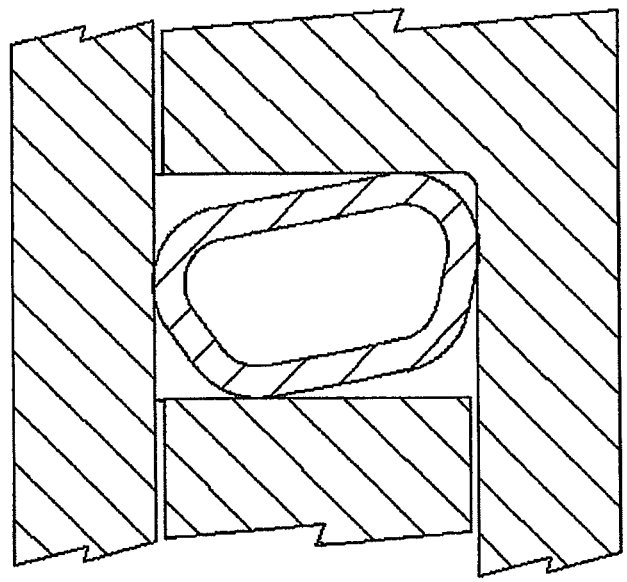
FIG. 14 is a partial central longitudinal sectional view of a seal having a hollow rounded-corner trapezoidal cross-section.

FIG. 14 shows a seal having an exterior cross-section is of rounded-corner trapezoidal form but being hollow. Such a seal may be formed from rough tube stock (e.g., circular cross-section) or by forming such a tube. The tube is bent into a hoop and its ends butt-welded to form a hollow metal O-ring. The desired cross-section may be formed by one or more shaping steps (e.g., rolling between shaped rollers). To facilitate the shaping, the O-ring may be gas-pressurized or liquid-filled (e.g., via drilling a port and pressurizing/filling and then at least temporarily closing the port). After shaping, the gas or liquid may be withdrawn and the port optionally re-closed (e.g., via welding). Finishing may be as with the other seals. Exemplary uses for such a hollow seal involve situations of relatively low compression force. For example, nuclear pressure vessel sealing commonly uses hollow metal O-ring seals.

The FIG. 14 seal might offer improved springback and might be appropriate for use as a replacement seal after a damaged seal groove has been machined to an oversize condition beyond which the baseline seal would not provide advantageous sealing. Hollow section seals may be particularly relevant as replacements for hollow metal O-ring seals in existing equipment because of similarities in their general characteristics and avoidance of the need to completely requalify vessels in which they are used. Solid section seals may be preferable for future applications (e.g., non-retrofit) because, among other things, they are easier to electroplate than hollow rings. Many existing hollow metal O-rings have one or more holes through their walls for mounting to the pressure vessel cover (lid). Fluids migrate into the interior of the hollow ring during plating, necessitating lengthy interstage rinsing procedures for their removal (to prevent carryover from plating tank to plating tank (e.g., between nickel strike and silver plating solutions)).

Figure 15:
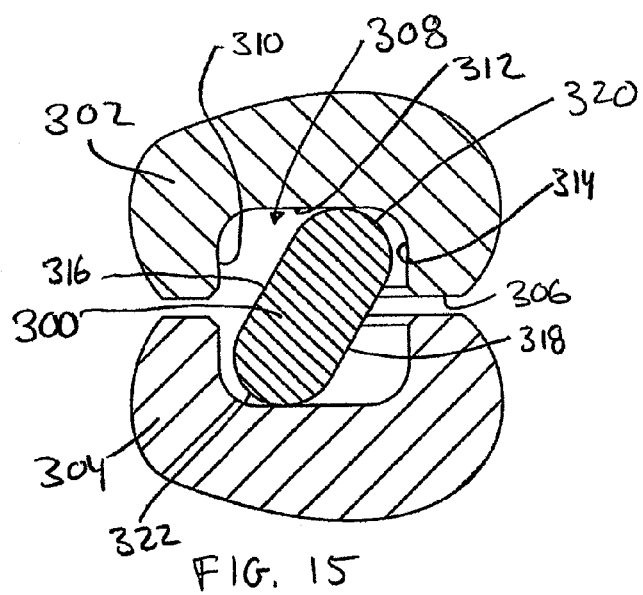
FIG. 15 is a partial central longitudinal sectional view of a second seal having an obround cross-section in an initial condition of installation between a pair of opposed flanges.

FIG. 15 shows another obround cross-section seal 300 in a relaxed condition in an initial stage of assembly between first and second flanges 302 and 304. Each flange has a mating face 306 in which a channel 308 is formed. The channel is bounded by an inboard surface 310, a base surface 312, and an outboard surface 314. In the exemplary configuration, the two channels are identical and mate to foam the space to be sealed. The obround seal section has a first side 316 which forms an interior/internal frustoconical surface of the seal 300. A second side 318 forms an exterior/external frustoconical surface. In the initial stage of installation, the first flange channel base 312 may contact an associated first rounded end 320 of the section. The base of the channel of the second flange 304 may contact a second rounded end 322. At this initial point of engagement, the seal may be in free (i.e., non-interfering) relation to the inboard and outboard surfaces 310 and 314 of both channels.

Figure 16:
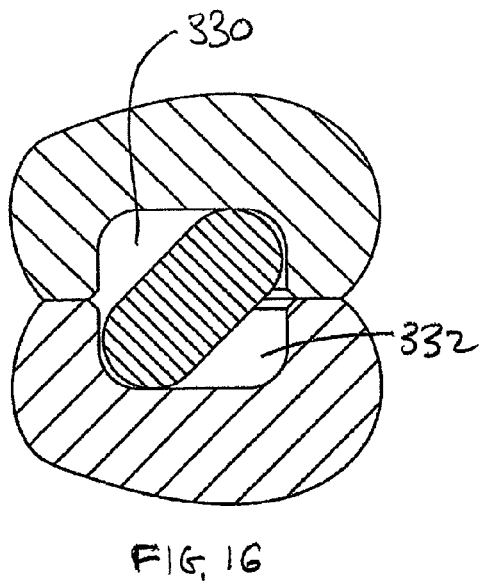
FIG. 16 is a view of the seal of FIG. 15 in a compressed condition of installation.

Further compression of the flanges to a fully mated condition will rotate the cross-section of the exemplary seal (e.g., clockwise as viewed in FIGS. 15 and 16). FIG. 16 shows a fully engaged condition wherein the seal separates a first region 330 of the combined channel/space from a second region 332. With the flanges fully mated or bottomed, or when other external constraint prevents further closure of the flanges, the seal may advantageously have further longitudinal compressibility relative to the flanges and an ability for its section to rotate about the section centerline. For example, the seal section may be oriented so that the seal does not interfere with at least one of inboard and outboard surfaces of the combined channel/space. Also, the sides 316 and 318 also would not be bottomed against channel surfaces so that the seal itself is not what prevents the further drawing together of the two opposed surfaces 312 of the channels.

The non-bottoming of the seal may have one or more of several advantages. First, manufacturing tolerances and wear tolerances of the members being sealed (e.g., the flanges) may be more easily accommodated. Differential thermal expansion may also be more easily accommodated (e.g., thermal expansion of the seal relative to the space being sealed). In some applications, it may be desirable to provide further flexibility by not having the flanges bottomed. Non-bottoming flanges could be provided with an adjustment mechanism to adjust the precompression of the seal. Such adjustment may also be useful for addressing tolerance issues.

The effective leveraging or mechanical advantage associated with rotating the seal cross-section may make the radial contact loads particularly sensitive to the longitudinal position. This is exacerbated by any radial tolerance problems. Accordingly, the adjustment mechanism may be particularly useful where there are radial tolerance issues or where relatively precise control over the radial loading is required.

Figure 17:
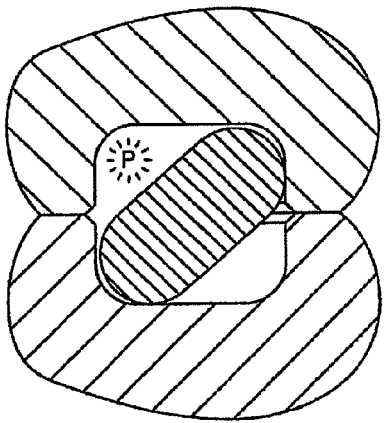
FIG. 17 is a view of the seal of FIG. 16 under a first pressure difference.

In the exemplary configuration of FIG. 16, with fully mated flanges, the seal does not interfere with either of the surfaces 310 or 314 of both channels in the absence of a pressure difference. FIG. 17 shows a net pressure P in the region 330 above that in the region 332. This net pressure may further rotate the seal about its contact location with the second flange 304. This further rotation may bring the seal first end 320 into engagement with the outboard surface 314 of the channel of the first flange 302. This rotation may, further, cause disengagement of the seal from the base surface 312 of the channel of the first flange 302. However, sealing may be maintained.

Figure 18:
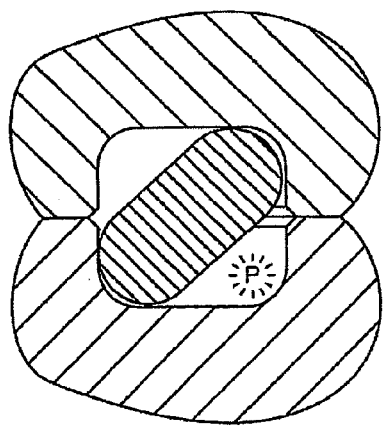
FIG. 18 is a view of the seal of FIG. 16 under a second pressure difference.

The pressure difference may be reversed. FIG. 18 shows a pressure P in the region 332 above that in the region 330. The pressure difference may cause a further rotation about the contact location with the first flange 302. This further rotation may bring the seal section second end into sealing engagement with the inboard surface 310 of the channel of the second flange 304.

Figures 19, 20:
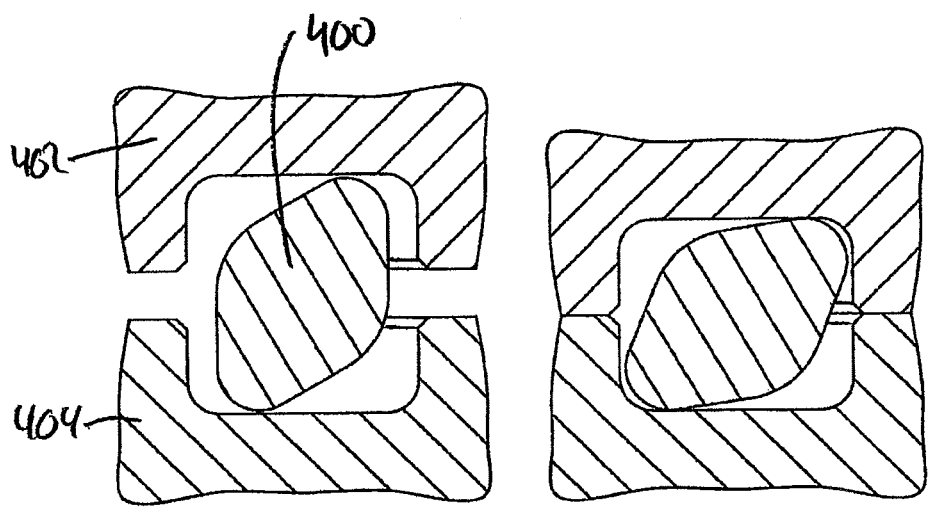
FIG. 19 is a partial central longitudinal sectional view of a seal having a round-corner rhomboid cross-section in an initial condition of installation between a pair of opposed flanges.
FIG. 20 is a view of the seal of FIG. 19 in a compressed condition of insulation.
Figures 21, 22:
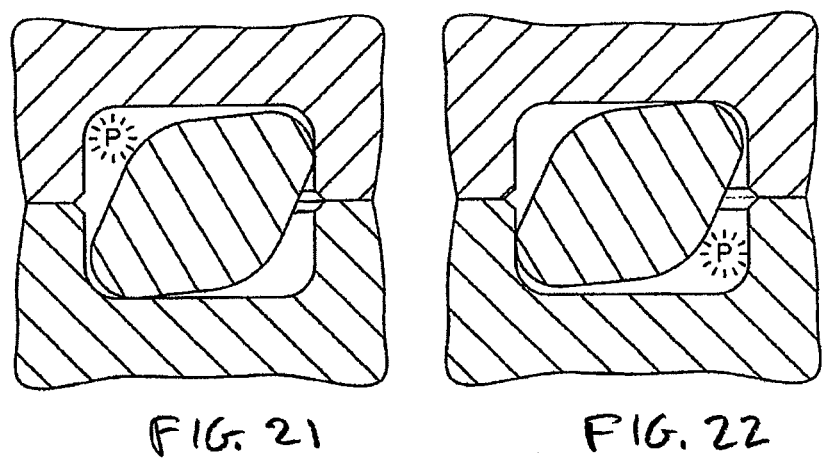
FIG. 21 is a view of the seal of FIG. 19 under a first pressure difference.
FIG. 22 is a view of the seal of FIG. 19 under a second pressure difference.
Figure 23:
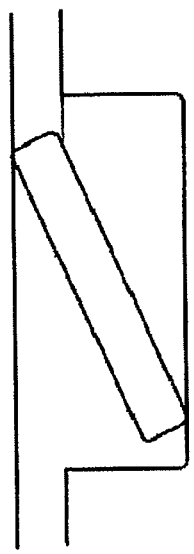
FIG. 23 is a partial central longitudinal sectional view of a rounded-corner rectangular section seal in an initial condition of installation.

FIGS. 19-20 show a seal 400 having a cross-section characterized as a rounded-corner rhomboid. Engagement with flanges 402 and 404 may be similar to that of the seal 300 of FIGS. 15-18.

Figure 24:
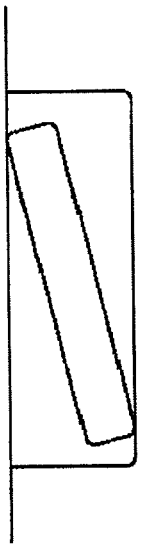
FIG. 24 is a view of the seal of FIG. 23 under compression.
Figure 25:
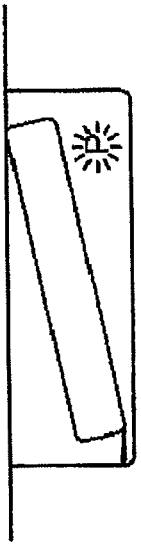
FIG. 25 is a view of the seal of FIG. 23 as opposed to a first pressure difference.
Figure 26:
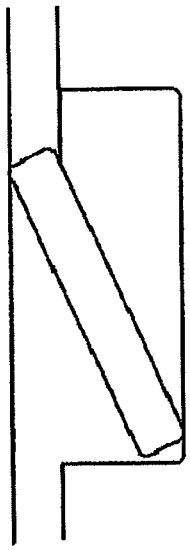
FIG. 26 is a partial central longitudinal sectional view of a rounded-corner rectangular section seal in an initial condition of installation.
Figure 27:
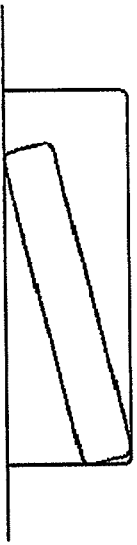
FIG. 27 is a view of the seal of FIG. 26 under compression.
Figure 28:
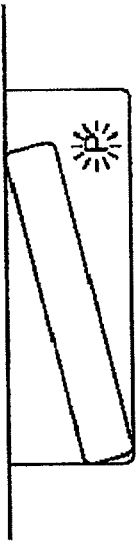
FIG. 28 is a view of the seal of FIG. 26 exposed to a first pressure difference.

FIGS. 23-28 contrast an exemplary non-interfering sealing situation (FIGS. 23-25) with an exemplary singly interfering sealing situation (FIGS. 26-28). The singly-interfering situation involves interference at one of an inboard surface and an outboard surface. Although shown in a space formed by a channel in a single member, the illustration is equally applicable to spaces formed by mating channels in each of the two members being sealed. Although shown with a seal having a generally rectangular cross-section with small radius of curvature rounded corners, other seal shapes may be involved. The difference between the two situations is that the FIG. 23-25 situation has relatively more clearance between the seal and the channel inboard surface in the initial (relaxed) condition. With the flanges fully mated and the seal compressed, FIG. 24 shows clearance between the seal and the inboard surface of the space. However, in the second situation, during the initial compression of the seal from the FIG. 26 condition, the seal engages the inboard surface so as to interfere in the mated FIG. 27 condition.

In the FIG. 24 situation, an operational pressure difference P in the region between the seal and second flange above the pressure in the region between the seal and first flange will cause the seal section to rotate about its contact location with the first flange and disengage from the second flange to create a sealing failure (FIG. 25). However, in the FIG. 27 situation, this pressure difference (FIG. 28) creates and/or increases sealing contact between the seal and the inboard surface along the second flange while maintaining contact between the seal and the first flange. For an opposite anticipated operational pressure difference, the channel could be positioned so that the pressure-induced sealing interference was with the channel outboard surface.

FIGS. 29-31 show a seal 600 for sealing a space defined by mated channels 602 and 604 extending from end faces 606 and 608 of flanges 610 and 612. The exemplary seal 600 is of near-obround cross-section with an exterior side 620 and an interior side 622. An inboard end 624 is essentially round. An outboard end 626 is slightly off-round, flattened toward the outboard side 620 for broader mating with the outer surface of the space. FIG. 30 shows the seal in a compressed, un-pressurized condition wherein the inboard end 624 of the seal section is accommodated with clearance at an intersection of the base and inboard surface of the channel 602. The outboard end is accommodated at an intersection of the base and outboard surface of the channel 604.

In FIG. 31, the seal 600 is exposed to an internal pressure greater than an external pressure. The pressure difference rotates the seal slightly counterclockwise in the particular view about the inboard end 624. The outboard end 626 bears into firmer engagement with the outboard surface of the space and may shift out of engagement with the base surface of the 14 channel 604. For reference, the seal is shown in an exemplary coupling wherein the flanges are secured by a clamp 614 such as in a pipe coupling. An alternative joint is an aircraft engine bleed air duct. As is discussed further below, a pressure in an interior 616 of the duct may exceed a pressure in an exterior environment 618.

FIGS. 32 and 33 show a turbomachine (e.g., turbine) vane ring 700 (e.g., of a combustor outlet nozzle) comprising a circumferential array of vane segments 702. Exemplary vane segments have an inboard platform 704 and an outboard shroud 706. One or more foils 708 may extend between the platform and shroud. The exemplary platform is sealed in a front/upstream location to a first member/structure 710 and at an aft/downstream location to a second member/structure 712. An exemplary first structure may be a combustion liner. An exemplary second structure may be a mounting flange. The first and second structures may be continuous, un-segmented structures. An exemplary front seal 720 is positioned in a space 722 defined between the structure 710 and the platform 704. An inboard/forward corner of the exemplary seal 720 engages a radially-extending surface 730 of the structure 710. An outboard end of the seal 720 is captured at the junction of a radially-extending surface 732 and an axially-extending surface 734 of the platform. During installation, before axial compression of the seal there may be radial clearance between the seal outboard end and the surface 734. Axially compressive engagement by the surface 730 may rotate the outboard end into engagement or into firmer engagement with the surface 734. The exemplary aft seal 750 is positioned in a channel 752 formed entirely in the structure 712 and engages a radially-extending surface 754 of the platform.

Such seals 720 and 750 may offer increased robustness relative to thin self-energizing compression spring seals (e.g., formed of convoluted sheetmetal rings such as having cross-sections resembling the letter E or the Greek capital letters sigma (Σ) or omega (Ω)). Surface discontinuities of the vane ring 700 at junctions between the segments 702 may wear the seal during operation. For a sheetmetal seal, the thinness of the metal allows only a slight amount of wear before failure. With the thicker seals of FIG. 33, more wear (and thus a greater operational time) can be tolerated.

Figure 34:
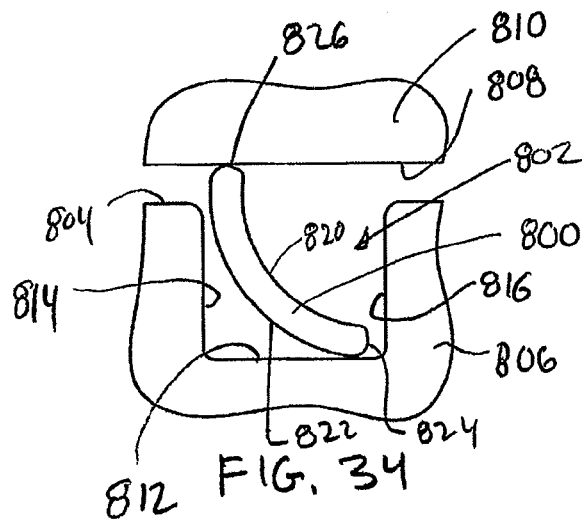
FIG. 34 is a partial central longitudinal sectional view of an arcuate section seal in an initial condition of installation.
Figure 35:
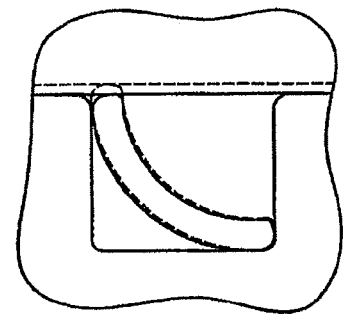
FIG. 35 is a view of the seal of FIG. 34 in a compressed condition.

FIGS. 34 and 35 show a seal 800 having an arcuate cross-section. An exemplary cross-section is of an annular segment having rounded ends. As is discussed below, in distinction to the seals of FIGS. 1-4, this seal is subject to a greater degree of flexing of its cross-section relative to rotation of its cross-section. In this vein, a line representing the maximum cross-sectional distance and a line connecting the contact locations of the section may pass outside of the seal. In a relaxed condition, the arc of the seal is slightly less than 90° (e.g., 70-85°). The seal 800 is positioned to seal a space 802 formed by a channel in the face 804 of a first flange 806 on the one hand and an end face 808 in a second flange 810 on the other hand.

Figure 36:
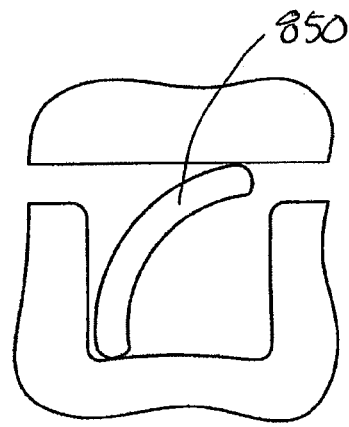
FIG. 36 is a partial central longitudinal sectional view of an arcuate section seal in an initial condition of installation.
Figure 37:
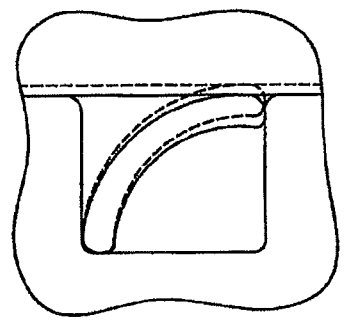
FIG. 37 is a view of the seal of FIG. 36 in a compressed condition.

The channel has a base surface 812 and first and second side surfaces 814 and 816. The arcuate cross-section is characterized by a concave side 820, a convex side 822, and first and second ends 824 and 826. In the initial relaxed insertion, the seal may contact the base 812 near the intersection of the convex surface 822 and the first end 824. In the first end 824 may be clear of the surface 816 at this point. Similarly, the convex surface 822 may be clear if the surface 814. The end 826 protrudes beyond the flange face 804. In the compressed state, the end 824 is driven outward into engagement with the surface 816. The second end 826 is driven flush with the flange and 804. This may bring the seal into compressive engagement with the surface 814 (e.g., near a junction of the convex surface 822 and concave surface 820). FIGS. 36 and 37 show a seal 850 whose cross-section is reversed (inverted) relative to the seal 800.

FIGS. 38-41 show use of a segmented seal of cross-section similar to that of the non-segmented full annulus seals of FIGS. 1-4. The exemplary seal is formed in two segments each of which form essentially 180° of the total seal. The exemplary seal has an upper segment 900 and a lower segment 902. Exemplary uses are in horizontally split cases (e.g., of steam or gas turbines). The exemplary turbomachine case 910 includes a section 912 having an upper case segment 914 and a lower case segment 916. Case sections 918 and 920 are respectively shown to the left and right (e.g., fore and aft or upstream and downstream) of the section 912. The segment 914 has first and second end faces 930 and 932. Each of these may include a channel 934 for carrying an associated seal for sealing with the end surface of the adjacent section 918 and/or 920. The exemplary channels 934 have a base surface 940, an inboard surface 942, and an outboard surface 944. Each segment 900 and 902 has a first end 950 and a second end 952. The exemplary ends 950 protrude slightly from the case split whereas the exemplary ends 952 are sub-flush. When the case is assembled, the end 950 of each seal is received in the channel of the opposite segment to bear against the end 952 of the other seal. Engagement between the ends may create a desired hoop compression. This compression, along with the sealing effects discussed above for the seals of FIGS. 1-4, may help maintain the seal in sealing engagement with the outer surface 944, base surface 940, and mating surface of the adjacent case segment.

One or more embodiments of the present invention have been described. Nevertheless, it will be understood that various modifications may be made without departing from the spirit and scope of the invention. For example, as noted above, the particular anticipated pressure differences may influence the selection of seal cross-sectional shape and orientation. In reengineering, remanufacturing, or retrofit applications, details of the existing components to be sealed may influence details of any particular implementation. Accordingly, other embodiments are within the scope of the following claims:

The invention claimed is:
1. A method for sealing an annular-shaped space defined by a cavity having predominately straight inner sidewalls, including a top surface, a bottom surface in a radial direction, an inboard and an outboard surface in a longitudinal direction, the method comprising:
   inserting a seal having a rounded-corner rhomboid or obround cross-section into the space without radial interference inboard or outboard;
   engaging first and second end portions of the seal with said top and bottom surfaces of the space while said seal separated from, and not in contact with, said inner sidewalls;
   compressing the seal between the top and bottom surfaces, the compressing causing the first and second end portions to contact the top and bottom surfaces of the space, respectively, such that the seal separates a first region of the space from a second region of the space;
   exposing the seal to an operational pressure difference in either the first region of the space or the second region of the space, which strains and shifts the seal to rotate a cross-section of the seal to bias the seal into engagement with only one of the inboard and outboard surfaces of the space and at least the top or bottom side, but not both the top and bottom sides.

2. The method of claim 1 wherein:
the engaged first and second end portions are offset normal to a direction of the compressing so as to provide a force couple to induce the rotating.

3. The method of claim 1 wherein:
the seal is a continuous annulus and the first and second end portions have initial contact with said top and bottom surfaces, respectively, before compression forming contact points, and said contact points are radially offset from each other normal to a central axis of the seal.

4. The method of claim 1 wherein:
said obround cross-section has an exterior perimeter formed as a rounded-corner trapezoid, and wherein, in a relaxed condition, the base and top of the trapezoid have radially offset normals.

5. The method of claim 4 wherein:
the engaging is along first and second diagonally opposite said rounded corners; and
a combination of the compressing and an operational pressure difference increases forces between third and fourth said rounded corners and the inboard and outboard surfaces while creating or tending to create a gap between the higher pressure side of the seal and the adjacent planar surface on that side.

6. The method of claim 1 applied with inboard and outboard such seals to seal between three members:
 a first member providing the inboard surface for the inboard seal;
 a second member providing the outboard surface for the inboard seal and the inboard surface for the outboard seal; and
 a third member providing the outboard surface for the outboard seal.

7. The method of claim 6 wherein:
said first member is a tubing hanger;
said second member is a spacer;
said third member is a wellhead.

8. The method of claim 1 further comprising engineering the seal, the engineering comprising:
 determining a desired seal response to a fluid pressure difference across the seal in the space, the desired response including an increase in engagement bias of the seal against only one of the inboard and outboard surfaces; and
 selecting at least one parameter of shape and orientation of the cross-section to provide the desired response.

* * * * *